US008798290B1

(12) United States Patent
Choi et al.

(10) Patent No.: US 8,798,290 B1
(45) Date of Patent: Aug. 5, 2014

(54) SYSTEMS AND METHODS FOR ADAPTIVE SIGNAL EQUALIZATION

(75) Inventors: Sangnam Choi, San Jose, CA (US); Chad Seguin, Morgan Hill, CA (US)

(73) Assignee: Audience, Inc., Mountain View, CA (US)

( * ) Notice: Subject to any disclaimer, the term of this patent is extended or adjusted under 35 U.S.C. 154(b) by 446 days.

(21) Appl. No.: 12/841,098

(22) Filed: Jul. 21, 2010

Related U.S. Application Data

(60) Provisional application No. 61/326,573, filed on Apr. 21, 2010.

(51) Int. Cl.
*H04B 15/00* (2006.01)

(52) U.S. Cl.
USPC ..................... 381/94.1; 381/71.1; 379/406.01

(58) Field of Classification Search
USPC ............... 381/73.1, 71.1, 94.1–94.4, 98, 103; 455/570, 556.1; 379/420.01–420.03, 379/406.01, 406.08
See application file for complete search history.

(56) References Cited

U.S. PATENT DOCUMENTS

| | | | | |
|---|---|---|---|---|
| 6,381,284 | B1 * | 4/2002 | Strizhevskiy | 375/257 |
| 6,717,991 | B1 * | 4/2004 | Gustafsson et al. | 375/285 |
| 7,773,741 | B1 * | 8/2010 | LeBlanc et al. | 379/406.01 |
| 7,970,123 | B2 * | 6/2011 | Beaucoup | 379/406.02 |
| 8,194,880 | B2 * | 6/2012 | Avendano | 381/92 |
| 8,204,252 | B1 * | 6/2012 | Avendano | 381/94.7 |
| 8,345,890 | B2 * | 1/2013 | Avendano et al. | 381/94.3 |
| 2009/0063142 | A1 * | 3/2009 | Sukkar | 704/226 |
| 2009/0119099 | A1 * | 5/2009 | Lee et al. | 704/226 |
| 2009/0192791 | A1 * | 7/2009 | El-Maleh et al. | 704/219 |
| 2009/0323982 | A1 * | 12/2009 | Solbach et al. | 381/94.3 |
| 2010/0278352 | A1 * | 11/2010 | Petit et al. | 381/71.1 |
| 2011/0182436 | A1 * | 7/2011 | Murgia et al. | 381/71.1 |

* cited by examiner

*Primary Examiner* — Vivian Chin
*Assistant Examiner* — Friedrich W Fahnert
(74) *Attorney, Agent, or Firm* — Carr & Ferrell LLP

(57) ABSTRACT

The present technology minimizes undesirable effects of multi-level noise suppression processing by applying an adaptive equalization. A noise suppression system may apply different levels of noise suppression based on the (user-perceived) signal-to-noise-ratio (SNR). The resulting high-frequency data attenuation may be counteracted by adapting the signal equalization. The present technology may be applied in both transmit and receive paths of communication devices. Intelligibility may particularly be improved under varying noise conditions, e.g. when a cell phone user is moving in and out of noisy environments.

24 Claims, 6 Drawing Sheets

400

SYSTEMS AND METHODS FOR ADAPTIVE SIGNAL EQUALIZATION

CROSS REFERENCE TO RELATED APPLICATION

This application claims the benefit of U.S. Provisional Application No. 61/326,573, filed on Apr. 21, 2010, entitled "Systems and Methods for Adaptive Signal Equalization," having inventor Sangnam Choi, which is hereby incorporated herein by reference in its entirety.

BACKGROUND

Communication devices that capture, transmit and playback acoustic signals can use many signal processing techniques to provide a higher quality (i.e., more intelligible) signal. The signal-to-noise ratio is one way to quantify audio quality in communication devices such as mobile telephones, which convert analog audio to digital audio data streams for transmission over mobile telephone networks.

A device that receives a signal, for example through a microphone, can process the signal to distinguish between a desired and an undesired component. A side effect of many techniques for such signal processing may be reduced intelligibility.

There is a need to alleviate detrimental side effects that occur in communication devices due to signal processing.

SUMMARY OF THE INVENTION

The systems and methods of the present technology provide audio processing in a communication device by performing equalization on a noise-suppressed signal in order to alleviate detrimental side effects of noise suppression. Equalization may be performed based on a level of noise suppression performed on a signal. An indicator of the noise suppression (and therefore a basis for performing the equalization) may be a signal to noise ratio (SNR), a perceived SNR, or a measure of the echo return loss (ERL). The equalization applied to one or more signals may thus be adjusted according to a SNR (or perceived SNR) or ERL for a signal.

In some embodiments, the present technology provides methods for audio processing that may include receiving a first signal selected from a group consisting of a near-end acoustic signal and a far-end signal, the first signal including a noise component and a signal-to-noise ratio. An adjusted signal-to-noise ratio may be automatically determined based on characteristics of the first signal. A noise component of a second signal may be suppressed, wherein the second signal is selected from a group consisting of the near-end acoustic signal and the far-end signal. Equalization may be performed on the noise-suppressed second signal based on the adjusted signal-to-noise ratio of the first signal.

In some embodiments, the present technology provides methods for audio processing that may include estimating an amount of echo return loss based on a far-end signal in a communication device. A noise component of a first signal may be suppressed, wherein the first signal is selected from a group consisting of the near-end acoustic signal and the far-end signal. Equalization may be performed on the noise-suppressed first signal based on the estimated amount of echo return loss.

In some embodiments, the present technology provides systems for audio processing in a communication device that may include a microphone, a receiver, an executable module that determines an adjusted signal-to-noise ratio, an executable module that suppresses a noise component, and an equalizer. The microphone receives a near-end acoustic signal, the near-end acoustic signal including a noise component and a signal-to-noise ratio. The receiver receives a far-end signal, the far-end signal including a noise component and a signal-to-noise ratio. One executable module determines an adjusted signal-to-noise ratio of a first signal, wherein the first signal is selected from a group consisting of the near-end acoustic signal and the far-end signal. One executable module suppresses a noise component in a second signal, wherein the second signal is selected from a group consisting of the near-end acoustic signal and the far-end signal. The equalizer equalizes the noise-suppressed second signal based on the adjusted signal-to-noise ratio of the first signal.

In some embodiments, the present technology provides systems for audio processing in a communication device that may include an executable module that estimates an amount of echo return loss, an executable module that suppresses a noise component, and an equalizer. One executable module estimates an amount of echo return loss based on a far-end signal in a communication device. One executable module suppresses a noise component in a first signal, wherein the first signal is selected from a group consisting of the near-end acoustic signal and the far-end signal. The equalizer equalizes the noise-suppressed second signal based on estimated amount of echo return loss.

DESCRIPTION OF EXEMPLARY EMBODIMENTS

Figure 1:
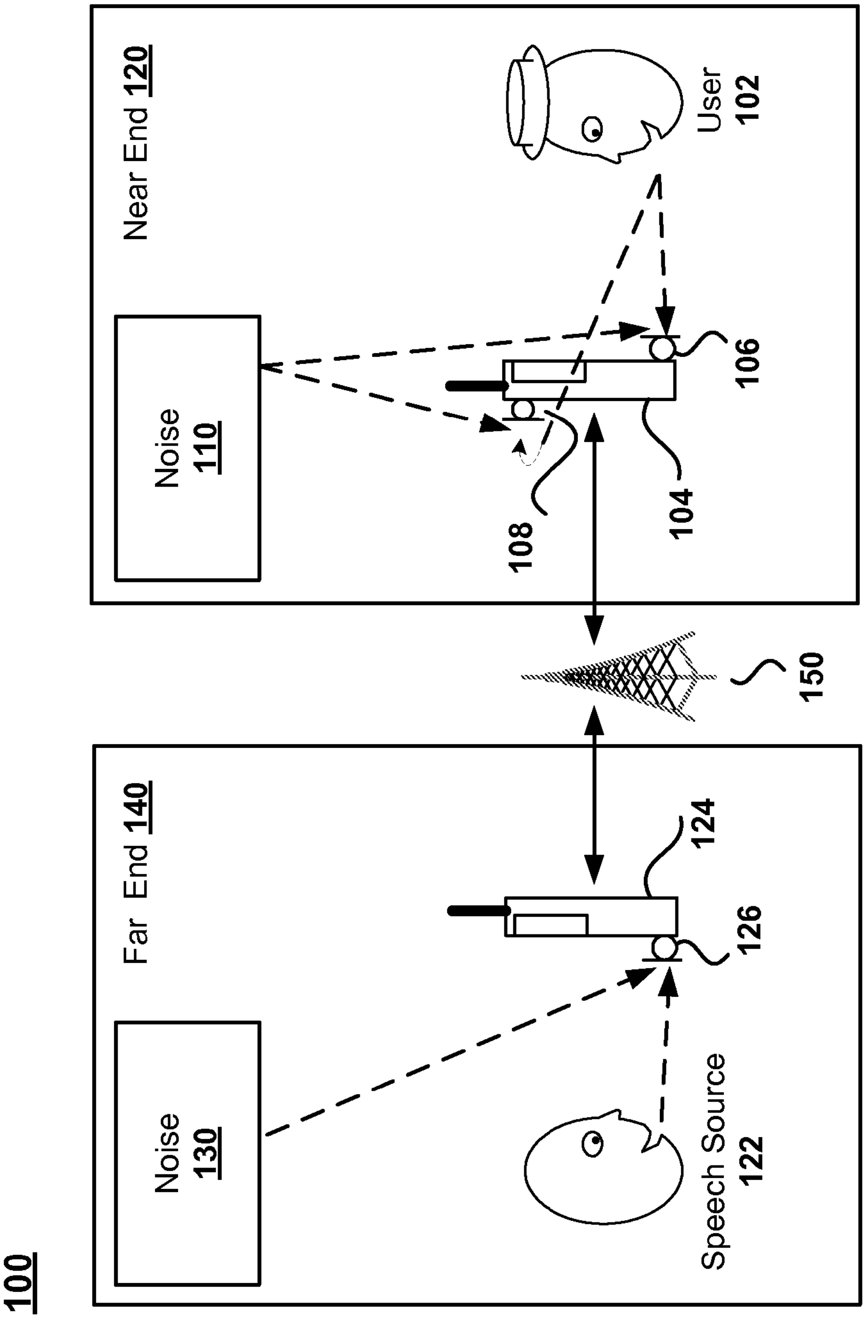
FIG. 1 illustrates an environment in which embodiments of the present technology may be practiced.

The present technology provides audio processing of an acoustic signal to perform adaptive signal equalization. The present system may perform equalization during post processing based on a level of noise suppression performed on a signal. An indicator of the noise suppression may be a signal to noise ratio (SNR), a perceived SNR, or a measure of the echo return loss (ERL). The equalization applied to one or more signals may be based on an SNR (or adjusted SNR) or ERL. This may allow the present technology to minimize differences in a final transmit signal and make receive audio signals more audible and comfortable in quiet conditions.

The adaptive signal equalization techniques can be applied in single-microphone systems and multi-microphone systems which transform acoustic signals to the frequency domain, the cochlear domain, or any other domain. The systems and methods of the present technology can be applied to both near-end and far-end signals, as well as both the transmit and receive paths in a communication device. Audio processing as performed in the context of the present technology may be used with a variety of noise reduction techniques, including noise cancellation and noise suppression.

A detrimental side effect of suppressing a noise component of an acoustic signal is reduced intelligibility. Specifically, higher levels of noise suppression may cause high-frequency data attenuation. A user may perceive the processed signal as muffled. By performing signal equalization, such a side effect may be reduced or eliminated.

Signal consistency during a change in user environmental conditions may be improved by applying the present technology in both a near-end user environment and a far-end user environment. An initial approximation for the expected level of noise suppression applied to a signal is the inherent SNR of that signal, which may be received from a near-end audio source (such as the user of a communication device) or from a far-end speech source (which, for example, may be received from a mobile device in communication with the near-end user's device). Higher levels of noise suppression correlate to increased attenuation of high-frequency components in the suppressed signal. A signal with a lower initial signal-to-noise ratio will typically require a higher level of noise suppression. In post-processing of a signal, signal equalization may counteract the detrimental effects of noise suppression on signal quality and intelligibility.

In addition to inherent SNR, the present system may determine an SNR as perceived by a user (adjusted SNR). Depending on characteristics of the signal, a user may perceive a higher or lower SNR than inherently present. Specifically, the characteristics of the most dominant noise component in the signal may cause the perceived SNR to be lower than the inherent SNR. For example, a user perceives so-called "pink" noise differently than "white" noise. Broadband noise requires less suppression than narrow-band noise to achieve the same perceived quality/improvement for a user. Suppression of broadband noise affects high-frequency components differently than suppression of narrow-band noise. Through analysis of the spectral representation of the noise components in a signal (i.e. a quantification of the frequency distribution of the noise), an adjusted SNR may be determined as a basis for the equalization that may be performed in post-processing.

The level of equalization (EQ) to perform on a signal may be based on an adjusted SNR for the signal. In some embodiments, the post-processing equalization (EQ) is selected from a limited set of EQ curves, wherein the selection may be based on the adjusted SNR, as well as heuristics derived by testing and system calibration. The limited set may contain four EQ curves, but fewer or more is also possible. Moreover, because SNR may be determined per frequency sub-band, an adjusted SNR may be determined based on characteristics of the signal in the corresponding frequency sub-band, such as the user-perceived SNR, or any other quantification of the noise component within that sub-band. An example of voice equalization is described in U.S. patent application Ser. No. 12/004,788, entitled "System and Method for Providing Voice Equalization," filed Dec. 21, 2007, which is incorporated by reference herein.

Equalization may also be performed based on echo return loss for a signal. Some embodiments of the present technology may employ a version of automatic echo cancellation (AEC) in the audio processing system of a communication device. The near-end microphone(s) may receive not only main speech, but also reproduced audio from the near-end output device, which causes echo. Echo return loss (ERL) is the ratio between an original signal and its echo level (usually described in decibels), such that a higher ERL corresponds to a smaller echo. ERL may be correlated to the user-perceived SNR of a signal. An audio processing system may estimate an expected amount of ERL, as a by-product of performing AEC, based on the far-end signal in a communication device and its inherent characteristics. An equalizer may be used to counteract the expected detrimental effects of noise suppression of either the near-end acoustic signal as used in the transmit path, or else the far-end signal in a communication device as used in the receive path, based on the estimated (expected) amount of ERL.

Embodiments of the present technology anticipate a user's behavior during changing conditions in the user environment. Assume for the following example that one user calls another user on a cell phone. Each user is likely to react to more noise in his environment by pressing the phone closer to his ear, which alters the spectral representation of the speech signal as produced by the user, as well as the speech signal received by the other user. For example, if the noise level in the far-end environment of the far-end speech source increases, a number of events are likely to occur. First, the far-end user may press his phone closer to his ear (to hear the transmitted near-end signal better), which alters the spectral characteristics of the speech signal produced by the far-end user. Second, the near-end user hears increased noise and may press the near-end phone closer to his ear (to hear the transmitted noisy far-end signal better). This will alter the spectral characteristics of the main speech signal produced by the near-end user. Typically, such a change in phone position causes a boost in low frequencies, which is detrimental to signal intelligibility. As a result, the far-end user may perceive a reduced SNR, and again react by pressing his far-end phone closer to his ear. Either near-end post-processing equalization, far-end post-processing equalization, or both can prevent this negative spiral of signal degradation. By boosting high frequencies through equalization, the detrimental effects of high levels of noise suppression, as well as the expected detrimental effects of the users' behavior in response to higher levels of noise, may be reduced or avoided.

Note that embodiments of the present technology may be practiced in an audio processing system that operates per frequency sub-band, such as described in U.S. patent application Ser. No. 11/441,675, entitled "System and Method for Processing an Audio Signal," filed May 25, 2006, which is incorporated by reference herein.

FIG. 1 illustrates an environment 100 in which embodiments of the present technology may be practiced. FIG. 1 includes near-end environment 120, far-end environment 140, and communication network 150 that connects the two. Near-end environment 120 includes user 102, exemplary communication device 104, and noise source 110. Speech from near-end user 102 is an audio source to communication device 104. Audio from user 102 (or "main talker") may be called main speech. The exemplary communication device 104 as illustrated includes two microphones: primary microphone 106 and secondary microphone 108 located a distance away from primary microphone 106. In other embodiments, communication device 104 may include one or more than two microphones, such as for example three, four, five, six, seven, eight, nine, ten or even more microphones.

Far-end environment 140 includes speech source 122, communication device 124, and noise source 130. Communication device 124 as illustrated includes microphone 126. Communication devices 104 and 124 both communicate with communication network 150. Audio produced by far-end speech source 122 (i.e. the far-end user) is also called far-end audio, far-end speech, or far-end signal. Noise 110 is also called near-end noise, whereas noise 130 is also called far-end noise. An exemplary scenario that may occur in environment 100 is as follows: user 102 places a phone call with his communication device 104 to communication device 124, which is operated by another user who is referred to as speech source 122. Both users communicate via communication network 150.

Primary microphone 106 and secondary microphone 108 in FIG. 1 may be omni-directional microphones. Alternatively, embodiments may utilize other forms of microphones or acoustic sensors/transducers. While primary microphone 106 and secondary microphone 108 receive and transduce sound (i.e. an acoustic signal) from user 102, they also pick up noise 110. Although noise 110 and noise 130 are shown coming from single locations in FIG. 1, they may comprise any sounds from one or more locations within near-end environment 120 and far-end environment 140 respectively, as long as they are different from user 102 and speech source 122 respectively. Noise may include reverberations and echoes. Noise 110 and noise 130 may be stationary, non-stationary, and/or a combination of both stationary and non-stationary. Echo resulting from far-end user and speech source 122 is typically non-stationary.

As shown in FIG. 1, the mouth of user 102 may be closer to primary microphone 106 than to secondary microphone 108. Some embodiments may utilize level differences (e.g. energy differences) between the acoustic signals received by microphone 106 and microphone 108. If primary microphone 106 is closer, the intensity level will be higher, resulting in a larger energy level received by primary microphone 106 during a speech/voice segment, for example. The inter-level difference (ILD) may be used to discriminate speech and noise. An audio processing system may use a combination of energy level differences and time delays to discriminate speech. Based on binaural cue encoding, speech signal extraction or speech enhancement may be performed. An audio processing system may additionally use phase differences between the signals coming from different microphones to distinguish noise from speech, or distinguish one noise source from another noise source.

Figure 2:
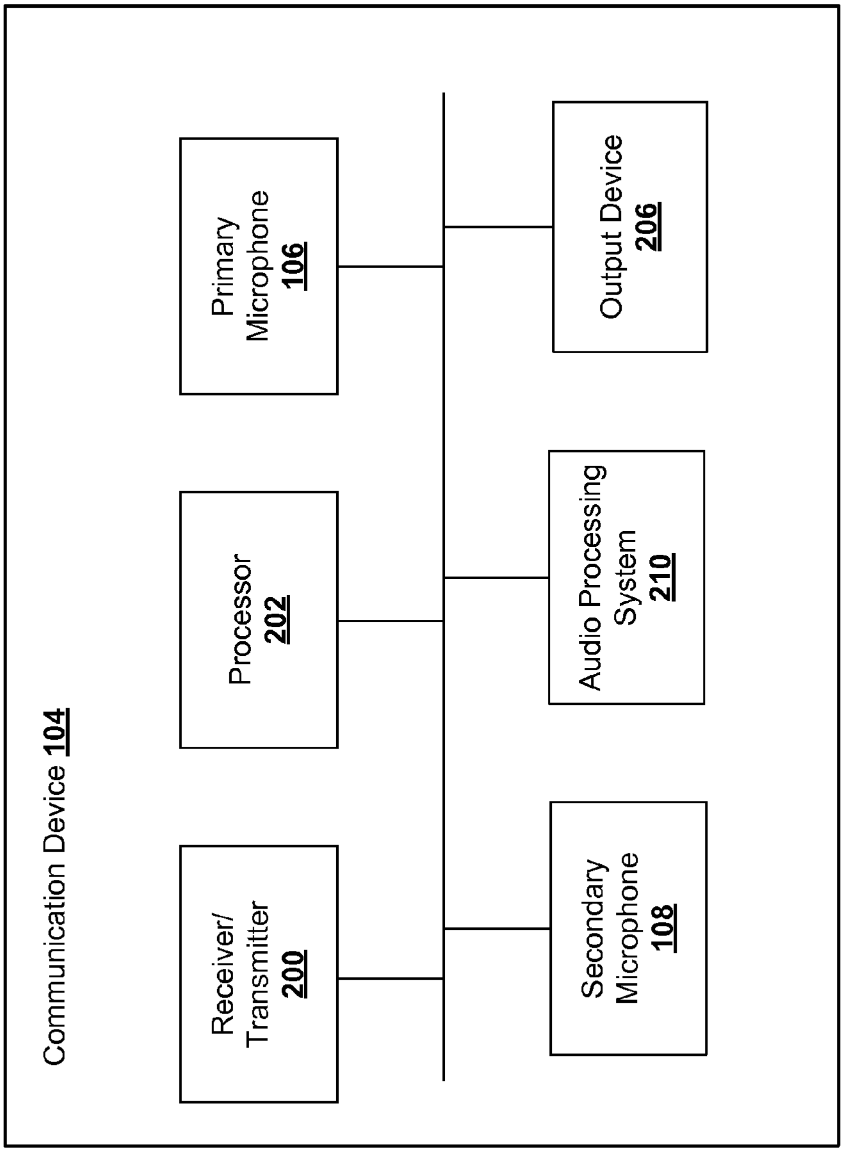
FIG. 2 is a block diagram of an exemplary communication device.

FIG. 2 is a block diagram of an exemplary communication device 104. In exemplary embodiments, communication device 104 (also shown in FIG. 1) is an audio receiving device that includes a receiver/transmitter 200, a processor 202, a primary microphone 106, a secondary microphone 108, an audio processing system 210, and an output device 206. Communication device 104 may comprise more or other components necessary for its operations. Similarly, communication device 104 may comprise fewer components that perform similar or equivalent functions to those depicted in FIG. 2. Additional details regarding each of the elements in FIG. 2 is provided below.

Processor 202 in FIG. 2 may include hardware and/or software, which implements the processing function, and may execute a program stored in memory (not pictured in FIG. 2). Processor 202 may use floating point operations, complex operations, and other operations. The exemplary receiver/transmitter 200 may be configured to receive and transmit a signal from a (communication) network. In some embodiments, the receiver/transmitter 200 may include an antenna device (not shown) for communicating with a wireless communication network, such as for example communication network 150 (FIG. 1). The signals received by receiver 200, microphone 106 and microphone 108 may be processed by audio processing system 210 and provided to output device 206. For example, audio processing system 210 may implement noise reduction techniques on the received signals. The present technology may be used in both the transmit and receive paths of a communication device.

Primary microphone 106 and secondary microphone 108 (FIG. 2) may be spaced a distance apart in order to allow for an energy level differences between them. The acoustic signals received by microphone 106 and microphone 108 may be converted into electric signals (i.e., a primary electric signal and a secondary electric signal). These electric signals may themselves be converted by an analog-to-digital converter (not shown) into digital signals for processing in accordance with some embodiments. In order to differentiate the acoustic signals, the acoustic signal received by primary microphone 106 is herein referred to as the primary acoustic signal, while the acoustic signal received by secondary microphone 108 is herein referred to as the secondary acoustic signal.

In various embodiments, where the primary and secondary microphones are omni-directional microphones that are closely-spaced (e.g., 1-2 cm apart), a beamforming technique may be used to simulate a forwards-facing and a backwards-facing directional microphone response. A level difference may be obtained using the simulated forwards-facing and the backwards-facing directional microphone. The level difference may be used to discriminate speech and noise, which can be used in noise and/or echo reduction.

Output device 206 in FIG. 2 may be any device that provides an audio output to a user or listener. For example, the output device 206 may comprise a speaker, an earpiece of a headset, or handset on communication device 104. In some embodiments, the acoustic signals from output device 206 may be included as part of the (primary or secondary) acoustic signal. This may cause reverberations or echoes, either of which are generally referred to as noise. The primary acoustic signal and secondary acoustic signal may be processed by audio processing system 210 to produce a signal with improved audio quality for transmission across a communication network and/or routing to output device 206.

Embodiments of the present invention may be practiced on any device configured to receive and/or provide audio such as, but not limited to, cellular phones, phone handsets, headsets, and systems for teleconferencing applications. While some embodiments of the present technology are described in reference to operation on a cellular phone, the present technology may be practiced on any communication device.

Some or all of the above-described modules in FIG. 2 may be comprised of instructions that are stored on storage media. The instructions can be retrieved and executed by processor 202. Some examples of instructions include software, program code, and firmware. Some examples of non-transitory storage media comprise memory devices and integrated circuits. The instructions are operational when executed by processor 202 to direct processor 202 to operate in accordance with embodiments of the present invention. Those skilled in the art are familiar with instructions, processor(s), and (non-transitory computer readable) storage media.

Figure 3:
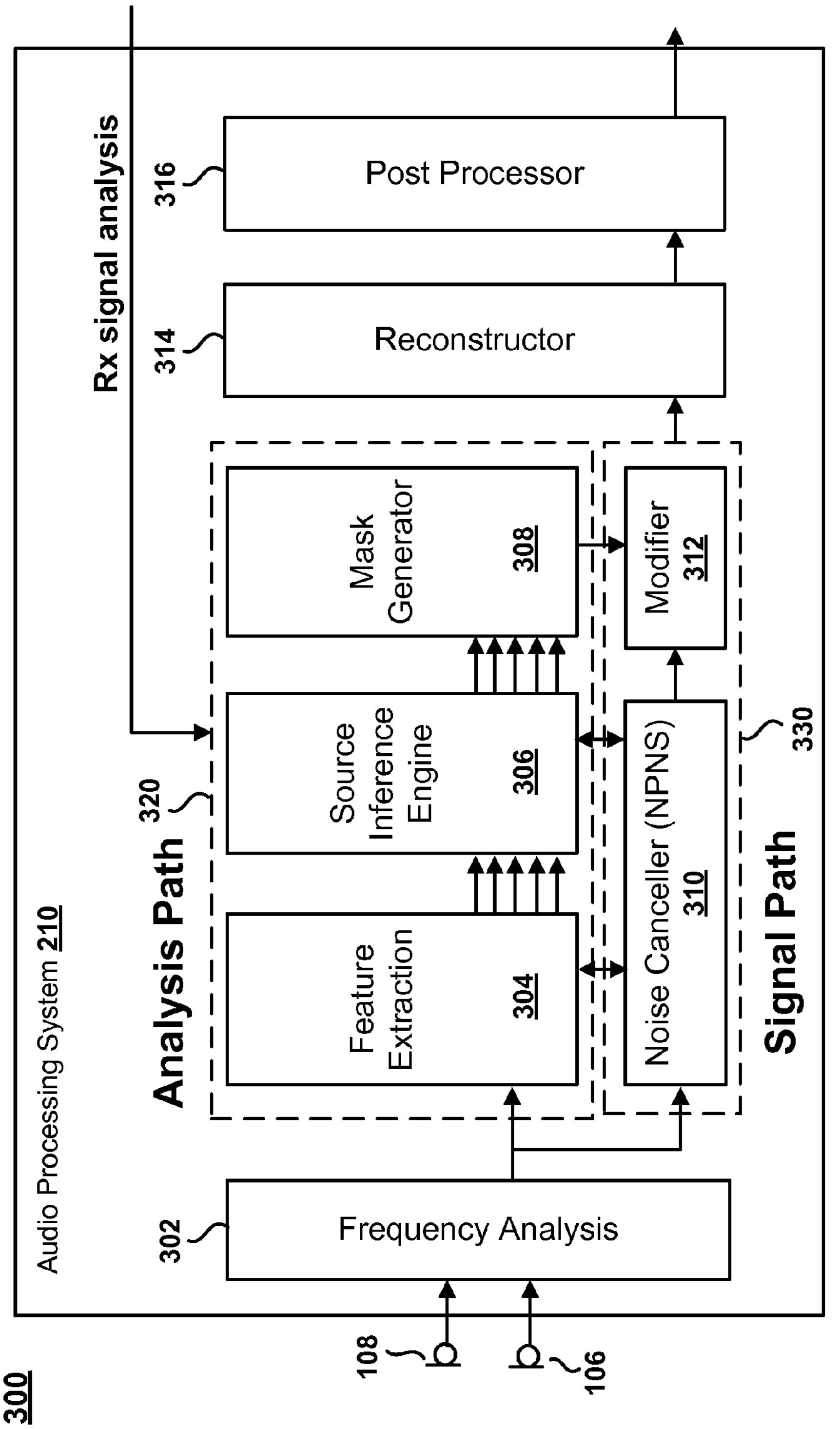
FIG. 3 is a block diagram of an exemplary audio processing system.

FIG. 3 is a block diagram of an exemplary audio processing system 210. In exemplary embodiments, audio processing system 210 (also shown in FIG. 2) may be embodied within a memory device inside communication device 104. Audio processing system 210 may include a frequency analysis module 302, a feature extraction module 304, a source inference module 306, a mask generator module 308, noise canceller (NPNS) module 310, modifier module 312, reconstructor module 314, and post-processing module 316.

Audio processing system 210 may include more or fewer components than illustrated in FIG. 3, and the functionality of modules may be combined or expanded into fewer or additional modules. Exemplary lines of communication are illustrated between various modules of FIG. 3, and in other figures herein. The lines of communication are not intended to limit which modules are communicatively coupled with others, nor are they intended to limit the number of and type of signals communicated between modules.

In the audio processing system of FIG. 3, acoustic signals received from primary microphone 106 and secondary microphone 108 are converted to electrical signals, and the electrical signals are processed by frequency analysis module 302. Frequency analysis module 302 receives the acoustic signals and mimcs the frequency analysis of the cochlea, e.g. simulated by a filter bank. Frequency analysis module 302 separates each of the primary and secondary acoustic signals into two or more frequency sub-band signals for each microphone signal. A sub-band signal is the result of a filtering operation on an input signal, where the bandwidth of the filter is narrower than the bandwidth of the signal received. Alternatively, other filters such as short-time Fourier transform (STFT), sub-band filter banks, modulated complex lapped transforms, cochlear models, wavelets, etc., can be used for the frequency analysis and synthesis.

Frames of sub-band signals are provided by frequency analysis module 302 to an analysis path sub-system 320 and to a signal path sub-system 330. Analysis path sub-system 320 may process a signal to identify signal features, distinguish between (desired) speech components and (undesired) noise and echo components of the sub-band signals, and generate a signal modifier. Signal path sub-system 330 modifies sub-band signals of the primary acoustic signal, e.g. by applying a modifier such as a multiplicative gain mask, or by using subtractive signal components generated in analysis path sub-system 320. The modification may reduce undesired components (i.e. noise) and preserve desired speech components (i.e. main speech) in the sub-band signals.

Signal path sub-system 330 within audio processing system 210 of FIG. 3 includes noise canceller module 310 and modifier module 312. Noise canceller module 310 receives sub-band frame signals from frequency analysis module 302 and may subtract (e.g., cancel) a noise component from one or more sub-band signals of the primary acoustic signal. As such, noise canceller module 310 may provide sub-band estimates of noise components and speech components in the form of noise-subtracted sub-band signals.

An example of null processing noise subtraction performed in some embodiments by the noise canceller module 310 is disclosed in U.S. application Ser. No. 12/422,917, entitled "Adaptive Noise Cancellation," filed Apr. 13, 2009, which is incorporated herein by reference.

Noise reduction may be implemented by subtractive noise cancellation or multiplicative noise suppression. Noise cancellation may be based on null processing, which involves cancelling an undesired component in an acoustic signal by attenuating audio from a specific direction, while simultaneously preserving a desired component in an acoustic signal, e.g. from a target location such as a main speaker. Noise suppression uses gain masks multiplied against a sub-band acoustic signal to suppress the energy level of a noise (i.e. undesired) component in a subband signal. Both types of noise reduction systems may benefit from implementing the present technology, since it aims to counteract systemic detrimental effects of certain types of signal processing on audio quality and intelligibility.

Figure 4:
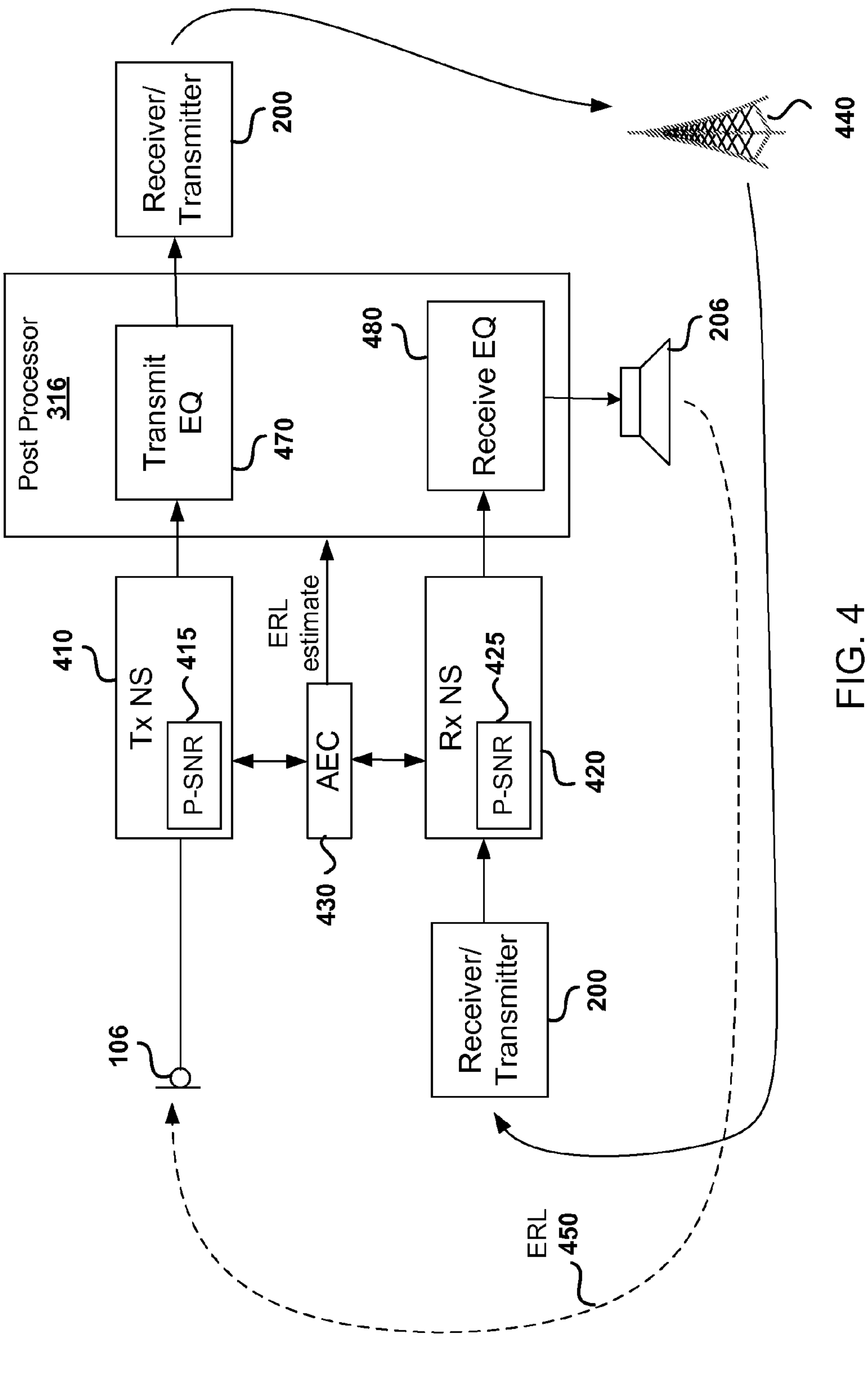
FIG. 4 is a block diagram of an exemplary post processor module.

Analysis path sub-system 420 in FIG. 4 includes feature extraction module 404, source interference module 406, and mask generator module 408. Feature extraction module 404 receives the sub-band frame signals derived from the primary and secondary acoustic signals provided by frequency analysis module 402 and receives the output of noise canceller module 410. The feature extraction module 404 may compute frame energy estimations of the sub-band signals, an inter-microphone level difference (ILD) between the primary acoustic signal and secondary acoustic signal, and self-noise estimates for the primary and second microphones. Feature extraction module 404 may also compute other monaural or binaural features for processing by other modules, such as pitch estimates and cross-correlations between microphone signals. Feature extraction module 404 may both provide inputs to and process outputs from Noise canceller module 410.

Source inference module 406 may process frame energy estimations to compute noise estimates, and which may derive models of noise and speech in the sub-band signals. Source inference module 406 adaptively estimates attributes of acoustic sources, such as the energy spectra of the output signal of noise canceller module 410. The energy spectra attribute may be used to generate a multiplicative mask in mask generator module 408.

Source inference module 406 in FIG. 4 may receive the ILD from feature extraction module 404 and track the ILD-probability distributions or "clusters" of user 102's (main speech) audio source, noise 110 and optionally echo. Source interference module 406 may provide a generated classification to noise canceller module 410, which may utilize the classification to estimate noise in received microphone energy estimate signals. A classification may be determined per sub-band and time-frame as a dominance mask as part of a cluster tracking process. In some embodiments, mask generator module 408 receives the noise estimate directly from noise canceller module 410 and an output of the source interference module 406. Source inference module 406 may generate an ILD noise estimator, and a stationary noise estimate.

Mask generator module 408 receives models of the sub-band speech components and noise components as estimated by source inference module 406. Noise estimates of the noise spectrum for each sub-band signal may be subtracted out of the energy estimate of the primary spectrum to infer a speech spectrum. Mask generator module 408 may determine a gain mask for the sub-band signals of the primary acoustic signal and provide the gain mask to modifier module 412. Modifier module 412 multiplies the gain masks with the noise-subtracted sub-band signals of the primary acoustic signal. Applying the mask reduces the energy level of noise components and thus accomplishes noise reduction.

Reconstructor module 414 converts the masked frequency sub-band signals from the cochlea domain back into the time domain. The conversion may include adding the masked frequency sub-band signals and phase shifted signals. Alternatively, the conversion may include multiplying the masked frequency sub-band signals with an inverse frequency of the cochlea channels. Once conversion to the time domain is completed, the synthesized acoustic signal may be post-processed and provided to the user via output device 206, output device 370, and/or provided to a codec for encoding.

In some embodiments, additional post-processing of the synthesized time domain acoustic signal may be performed, for example by post-processing module 416 in FIG. 4. This module may also perform the (transmit and receive) post-processing equalization as described in relation to FIG. 3. As another example, post-processing module 416 may add comfort noise generated by a comfort noise generator to the synthesized acoustic signal prior to providing the signal either for transmission or an output device. Comfort noise may be a uniform constant noise that is not usually discernable to a listener (e.g., pink noise). This comfort noise may be added to the synthesized acoustic signal to enforce a threshold of audibility and to mask low-level non-stationary output noise components. In some embodiments, the comfort noise level may be chosen to be just above a threshold of audibility and/or may be settable by a user.

The audio processing system of FIG. 4 may process several types of (near-end and far-end) signals in a communication device. The system may process signals, such as a digital Rx signal, received through an antenna, communication network 150 (FIG. 1, FIG. 3), or other connection.

A suitable example of an audio processing system 210 is described in U.S. application Ser. No. 12/832,920, entitled "Multi-Microphone Robust Noise Suppression," filed Jul. 8, 2010, the disclosure of which is incorporated herein by reference.

FIG. 4 is a block diagram of an exemplary post processor module 316. Post processor module 316 includes transmit equalization module 470 and receive equalization module 480. Post processor 316 may communicate with receiver/transmitter 200, transmit noise suppression module 410, receive noise suppression module 420, and automatic echo cancellation module 350. Transmit noise suppression module 410 includes perceived (i.e., adjusted) signal-to-noise ratio module (P-SNR) 415 and receive noise suppression modules 420 includes a P-SNR 425 respectively. Each P-SNR module may also be located outside a noise suppression module. Automatic echo cancellation (AEC) module 430 may communicate with each of suppression modules 410 and 420 and post processor module 316. Suppression modules 410 and 420 may be implemented within noise canceller 310, mask generator module 308, and modifier 312. AEC module 430 may be implemented within source inference engine 308.

Transmit noise suppression module 410 receives acoustic sub-band signals derived from an acoustic signal provided by primary microphone 106. Transmit noise suppression module 410 may also receive acoustic sub-band signals from other microphones. Microphone 106 may also receive a signal provided by output device 206, thereby causing echo return loss (ERL). An amount of expected ERL may be estimated by AEC 430, as an ERL estimate, and provided to post processor module 316. In operation, microphone 106 receives an acoustic signal from a near-end user (not shown in FIG. 4), wherein the acoustic signal has an inherent SNR and a noise component. Transmit noise suppression module 410 may suppress the noise component from the received acoustic signal.

P-SNR module 415 may automatically determine an adjusted signal-to-noise ratio based on the characteristics of the incoming near-end acoustic signal received by microphone 106. This adjusted (transmit) SNR may be provided to either transmit EQ module 470 or receive EQ module 480 as a basis to perform equalization.

Transmit EQ module 470 may perform equalization on the noise suppressed acoustic signal. The equalization performed by EQ module 470 may be based on the adjusted SNR determined by P-SNR module 415. After equalizing the signal, the resulting signal may be transmitted over a communication network to another communication device in a far-end environment (not shown in FIG. 4).

Similarly, an adjusted SNR may be determined for a received signal by P-SNR 425. The received signal may then be suppressed by receive suppression module 420 and equalized based on the adjusted SNR for the signal received by receiver/transmitter 200.

Signals received from a far-end environment may also be equalized by post processor 316. A signal may be received by receiver/transmitter 200 from a far-end environment, and have an inherent SNR and a noise component. Receive noise suppression module 420 may suppress the noise component contained in the far-end signal.

In the receive path, P-SNR module 425 may automatically determine an adjusted signal-to-noise ratio based on the characteristics of the incoming far-end signal. This adjusted (receive) SNR may be provided to either transmit equalizer 470 or receive equalizer 480 as a basis to perform equalization. The acoustic signal from output device 206 may cause echo return loss 450 through primary microphone 106. AEC module 430 may generate and provide an ERL estimate while performing automatic echo cancellation based on the far-end signal in the communication device. The ERL estimate may be provided to post processor 316 for use in performing equalization, for example by either transmit equalizer 470 or receive equalizer 480. Receive equalizer 480 may perform equalization on the noise-suppressed far-end signal based on the ERL estimate. The equalized signal may then be output by output device 370.

Figure 5:
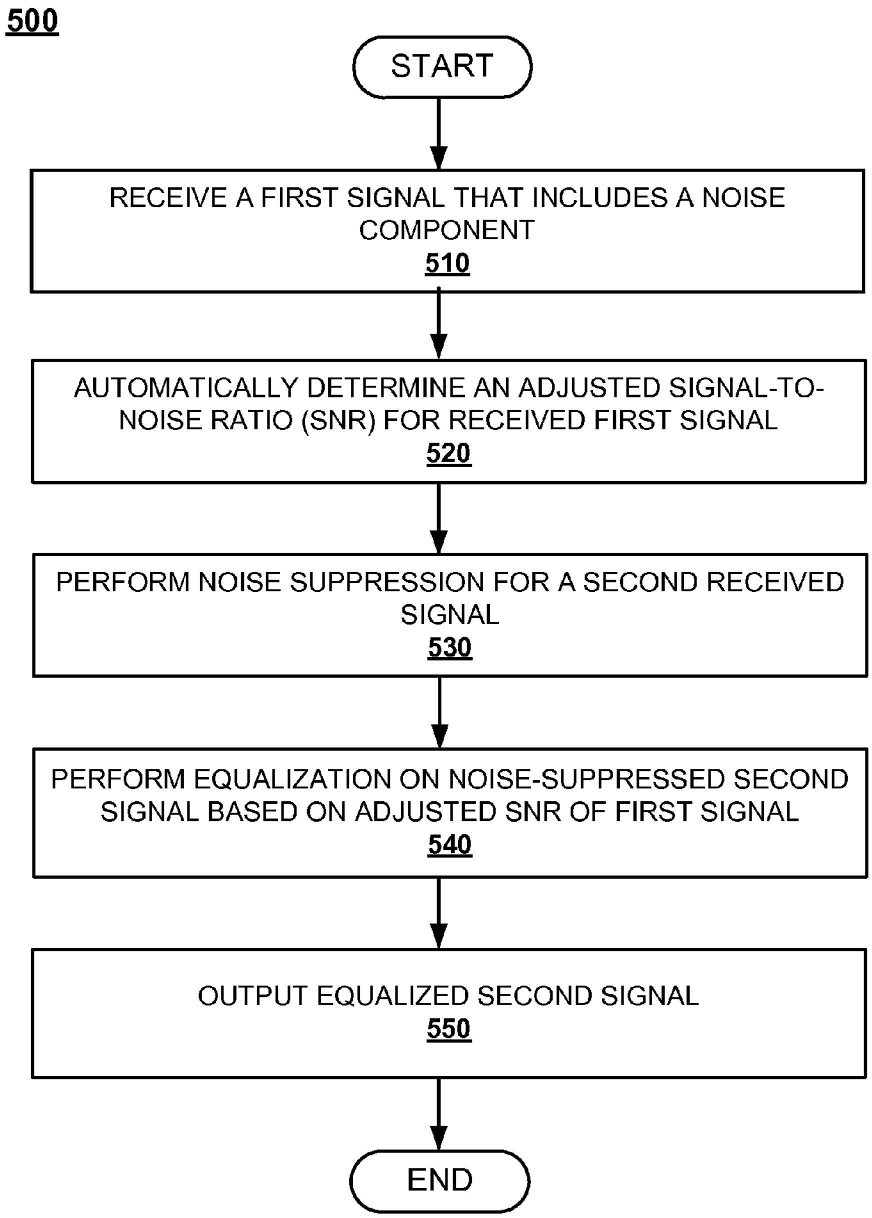
FIG. 5 illustrates a flow chart of an exemplary method for performing signal equalization based on a signal to noise ratio.

FIG. 5 illustrates a flow chart of an exemplary method for performing signal equalization based on a signal to noise ratio. A first signal with a noise component is received at step 510. With respect to FIG. 4, the first signal may be a signal received through microphone 106 or a signal received through receiver/transmitter 200 (coupled to receive suppression module 420). For the purpose of discussion, it will be assumed that the signal was received via microphone 106.

An adjusted SNR is automatically determined for the received signal at step 520. The adjusted SNR may be determined by P-SNR 418 for a signal received via microphone 106. The adjusted SNR may be a perceived SNR which is determined based on features in the received signal.

Noise suppression is performed for a second receives signal at step 530. When the first signal is received via microphone 106, the second microphone may be received via receiver/transmitter 200 and may undergo noise suppression processing by receive noise suppression module 420.

Equalization may be performed on the noise-suppressed second signal based on the P-SNR of the first signal at step 540. Receive EQ module 480 may perform equalization on the signal received and processed via receive suppression module 420 based on the P-SNR (adjusted SNR) determined by P-SNR module 418 for the first signal. The equalization may be applied to the second signal as one of several gain curves, wherein the particular gain curve is selected based on the P-SNR of the first signal. After performing equalization, the equalized second signal is output at step 540. The signal may be output by receiver/transmitter 200 or via microphone 206.

Though an example of a first signal received via microphone 206 was discussed, the first signal may be received as a far end signal via receiver/transmitter 200. In this case, the signal is received via receiver 200, noise suppressed by receive suppression module 420, a P-SNR is determined by P-SNR 428, and equalization is performed to a second signal received from microphone 106 by transmit equalization module 470.

The noise suppression, equalization and output may all be performed to the same signal. Hence, a first signal may be received at microphone 106, noise suppression may be performed on the signal by transmit suppression module 410, a P-SNR may be determined by P-SNR module 418, and equalization may be performed on the first signal at transmit equalization module 470.

The steps of method 500 are exemplary, and more or fewer steps may be included in the method of FIG. 5. Additionally, the steps may be performed in a different order than the exemplary order listed in the flow chart of FIG. 5.

Figure 6:
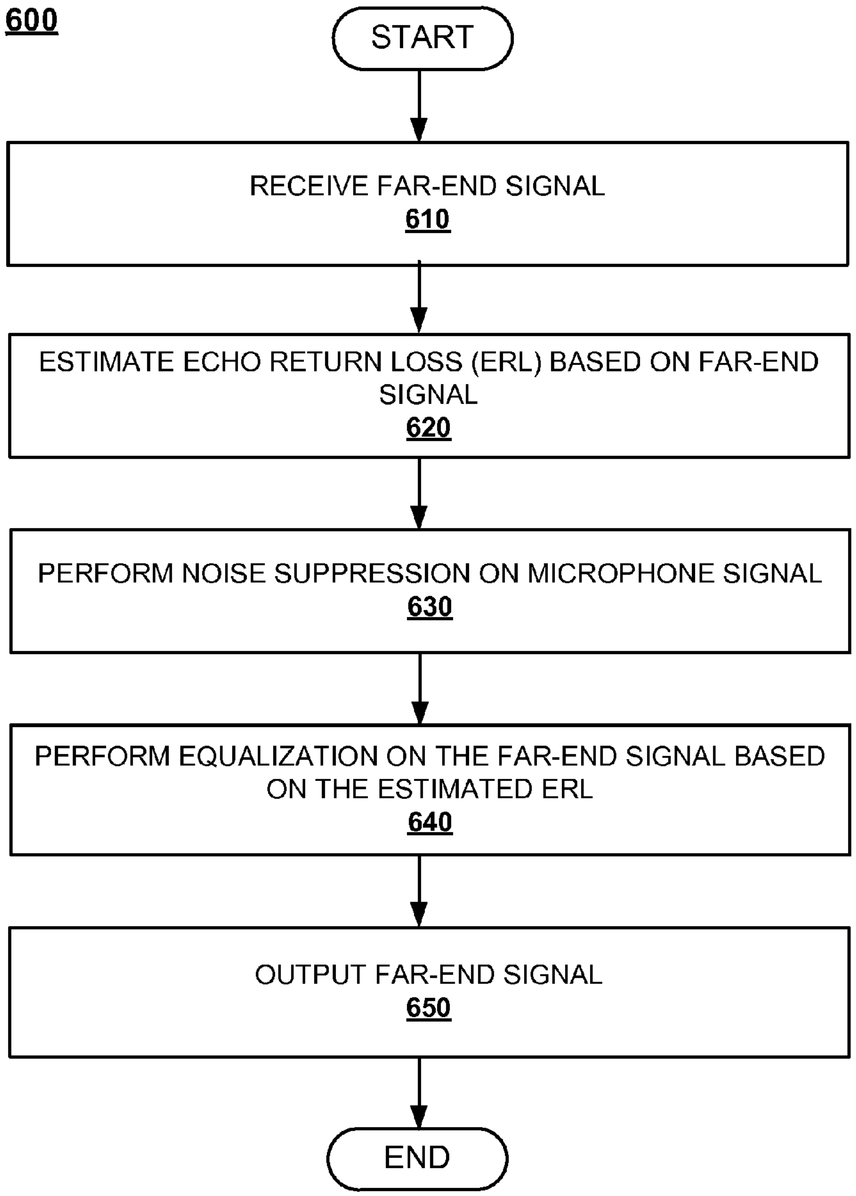
FIG. 6 illustrates a flow chart of an exemplary method for performing signal equalization based on echo return loss.

FIG. 6 illustrates a flow chart of an exemplary method for performing signal equalization based on echo return loss.

First, a far end signal is received at step 610. The far end signal may be received by receiver/transmitter 200 and ultimately provided to receive noise suppression module 420.

An echo return loss may be estimated based on the far-end signal at step 620. The echo return loss for the far-end signal may be the ratio of the far-end signal and its echo level (usually described in decibels). The echo level may be determined by the amount of signal that is suppressed by receive suppression module 420, equalized by receive EQ module 480, output by speaker 206, and received as ERL 450 by microphone 106. Generally, a higher ERL corresponds to a smaller echo.

Noise suppression may be performed on a microphone signal at step 630. The noise suppression may be performed by transmit noise suppression module 410. Equalization may then be performed on far end signal based on the estimated ERL at step 640. The equalization may be performed by transmit EQ module 470 on the noise-suppressed microphone far end signal. One of several equalization levels or curves may be selected based on the value of the ERL.

After equalization, the far-end signal is output at step 650. The far-end signal may be output through output device 206.

Multiple EQ curves may be used to minimize the changes in frequency response. For example, four EQ curves based on SNR conditions may be selected based on an API to update EQ coefficients regularly while application query and read SNR conditions.

As people press handset to his/her ear harder to hear the remote party better in noisier environment, the ERL can be changed/increased. We can adjust Tx and Rx equalization function based on the ERL changes to improve intelligibility.

For Rx side, typical mobile handset manufacturers often emply a tuning strategy to boost high pitched equalization characteristics to improve intelligibility. However, this approach has limitations since typically cell phones have only one equalization setting regardless of noise condition. The present technology will allow much better flexibility by detecting SNR conditions, and using an adjusted SNR to apply different Rx equalization parameters to make Rx audio more audible and comfortable in quiet condition. Rx Equalization function can be adjusted based on the near end noise condition. Different Rx Post Equalization function can be applied based on near end noise condition.

The present technology is described above with reference to exemplary embodiments. It will be apparent to those skilled in the art that various modifications may be made and other embodiments can be used without departing from the broader scope of the present technology. For example, embodiments of the present invention may be applied to any system (e.g., non speech enhancement system) utilizing AEC. Therefore, these and other variations upon the exemplary embodiments are intended to be covered by the present invention.

The invention claimed is:

1. A method for audio processing in a communication device, comprising:

receiving a first signal including a noise component and having a signal-to-noise ratio;

automatically determining an adjusted signal-to-noise ratio based on characteristics of the first signal;

suppressing, using a processor executing instructions stored in memory, a noise component of a second signal; and performing equalization on the noise-suppressed second signal based on the adjusted signal-to-noise ratio of the first signal.

2. The method of claim 1, wherein the characteristics of the first signal are selected to approximate a user's perception of the signal-to-noise ratio of the first signal.

3. The method of claim 1, wherein the characteristics of the first signal include a quantification of a frequency distribution of the noise component of the first signal.

4. The method of claim 1, wherein the determination, suppression, and equalization steps are performed per frequency sub-band.

5. The method of claim 1, wherein suppressing the noise component of the second signal is accomplished by using null processing techniques.

6. A method for audio processing in a communication device, comprising:

estimating, using a processor executing instructions stored in memory, an amount of echo return loss based on a far-end signal in the communication device;

suppressing a noise component of a first signal, wherein the first signal is selected from a group consisting of a near-end acoustic signal and the far-end signal; and performing equalization on the noise-suppressed first signal based on the estimated amount of echo return loss.

7. The method of claim 6, wherein suppressing the noise component of the first signal is accomplished by using null processing techniques.

8. A system for audio processing in a communication device, comprising:

a microphone that receives a near-end acoustic signal, the near-end acoustic signal including a noise component and having a signal-to-noise ratio;

a receiver that receives a far-end signal, the far-end signal including a noise component and having a signal-to-noise ratio;

a first executable module that determines an adjusted signal-to-noise ratio of a first signal based on characteristics of the first signal;

a second executable module that suppresses a noise component in a second signal; and an equalizer that equalizes the noise-suppressed second signal based on the adjusted signal-to-noise-ratio of the first signal.

9. The system of claim 8, wherein the characteristics of the first signal are selected to approximate a user's perception of the signal-to-noise ratio of the first signal.

10. The system of claim 8, wherein the characteristics of the first signal include a quantification of a frequency distribution of the noise component.

11. The system of claim 8, wherein the first executable module that determines the adjusted signal-to-noise ratio, the second executable module that suppresses the noise component, and the equalizer, operate per frequency sub-band.

12. A system for audio processing in a communication device, comprising:

a first executable module that estimates an amount of echo return loss based on a far-end signal in the communication device;

a second executable module that suppresses a noise component in a first signal, wherein the first signal is selected from a group consisting of a near-end acoustic signal and the far-end signal; and a processor to equalize the noise-suppressed first signal based on the estimated amount of echo return loss.

13. The system of claim 12, wherein the second executable module that suppresses the noise component and the processor operate per frequency sub-band.

14. The system of claim 12, wherein the second executable module that suppresses the noise component operates by using null processing techniques.

15. A non-transitory computer readable storage medium having embodied thereon a program, the program being executable by a processor to perform a method for audio processing in a communication device, the method comprising:

receiving a first signal including a noise component and having a signal-to-noise ratio;

automatically determining an adjusted signal-to-noise ratio based on characteristics of the first signal;

suppressing a noise component of a second signal; and performing equalization on the noise-suppressed second signal based on the adjusted signal-to-noise ratio of the first signal.

16. The non-transitory computer readable storage medium of claim 15, wherein the characteristics of the first signal are selected to approximate a user's perception of the signal-to-noise ratio of the first signal.

17. The non-transitory computer readable storage medium of claim 15, wherein the characteristics of the first signal include a quantification of a frequency distribution of the noise component of the first signal.

18. The non-transitory computer readable storage medium of claim 15, wherein suppressing the noise component of the second signal is accomplished by using null processing techniques.

19. A non-transitory computer readable storage medium having embodied thereon a program, the program being executable by a processor to perform a method for audio processing in a communication device, the method comprising:

estimating an amount of echo return loss based on a far-end signal in the communication device;

suppressing a noise component of a first signal, wherein the first signal is selected from a group consisting of a near-end acoustic signal and the far-end signal; and performing equalization on the noise-suppressed first signal based on the estimated amount of echo return loss.

20. The non-transitory computer readable storage medium of claim 19, wherein the suppression and equalization steps are performed per frequency sub-band.

21. The method of claim 1, wherein:

the first signal is a near-end acoustic signal; and the second signal is a far-end signal.

22. The method of claim 1, wherein:

the first signal is a far-end signal; and the second signal is a near-end acoustic signal.

23. The method of claim 1, wherein the performing of the equalization on the noise-suppressed second signal based on the adjusted signal-to-noise ratio of the first signal is further based on a selected one of a set of equalization curves.

24. The method of claim 1, wherein the performing of the equalization on the noise-suppressed second signal comprises increasing high frequency levels in response to an increase of the adjusted signal-to-noise ratio of the first signal.

* * * * *